United States Patent [19]

Matsumoto

[11] Patent Number: 4,610,537
[45] Date of Patent: Sep. 9, 1986

[54] PHOTOGRAPHIC IMAGE INFORMATION DETECTING DEVICE

[75] Inventor: Fumio Matsumoto, Tokyo, Japan

[73] Assignee: Fuji Photo Film Co., Ltd., Kanagawa, Japan

[21] Appl. No.: 691,110

[22] Filed: Jan. 14, 1985

[30] Foreign Application Priority Data

Jan. 19, 1984 [JP] Japan .................. 59-7533
Jan. 19, 1984 [JP] Japan .................. 59-7536

[51] Int. Cl.$^4$ .......................................... G03B 27/72
[52] U.S. Cl. .................. 355/68; 250/214 C; 250/214 P; 356/225; 356/233; 358/213
[58] Field of Search ............ 355/68, 69, 38, 41, 355/83, 14 R; 356/224, 225, 233, 218; 250/214 C, 214 P, 211 R; 358/212, 211, 213, 214

[56] References Cited

U.S. PATENT DOCUMENTS

| | | | |
|---|---|---|---|
| 3,533,705 | 10/1970 | Fukushima | 356/233 |
| 3,813,158 | 2/1982 | Zahn | 355/68 |
| 4,251,157 | 2/1981 | Knör et al. | 355/68 |
| 4,379,632 | 4/1983 | Dedden et al. | 355/68 |

FOREIGN PATENT DOCUMENTS 597930 3/1978 U.S.S.R. ................ 356/225

Primary Examiner—L. T. Hix
Assistant Examiner—D. Rutledge
Attorney, Agent, or Firm—Wenderoth, Lind & Ponack

[57] ABSTRACT

An image information detecting device for detecting the density for printing is required to cover a wide dynamic range corresponding to the density scope of the original film as well as to cover the fluctuation in values caused by different lamps and filters used in the photometric system. It is also important in photographic printing process to detect the density information on a relatively wide area of a frame of a negative film or the like in order to determine exposure or correction amount. The present invention enables the use of a storage-type light receiving element over a wide dynamic range as well as segmentation of picture images of a film of a wide scope into a large number of picture elements for detection.

11 Claims, 10 Drawing Figures

FIG. 5A
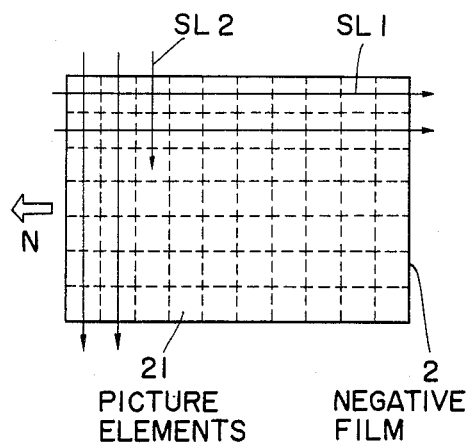
FIG. 5B
| 16 | 59 | 58 | 55 | | 43 | 31 |
| 12 | 57 | 56 | 55 | | 58 | 13 |
| 17 | 55 | 55 | 51 | | 56 | 16 |
| 15 | 52 | 52 | 47 | | 53 | 20 |
| 14 | 49 | 48 | 46 | | 49 | 23 |
| 12 | 47 | 46 | 45 | | 49 | 27 |
|  5 | 17 | 17 | 16 | | 45 | 30 |
MEMORY 44
FIG. 6
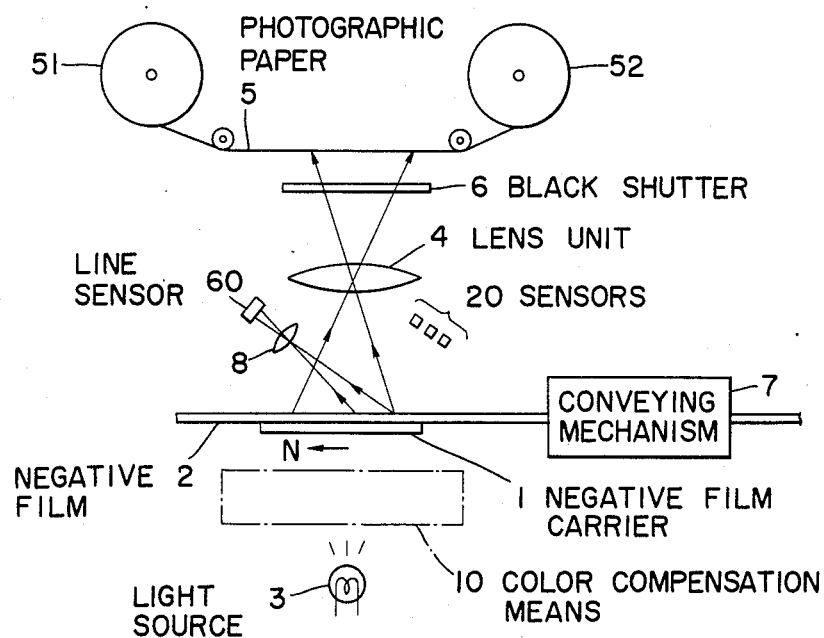

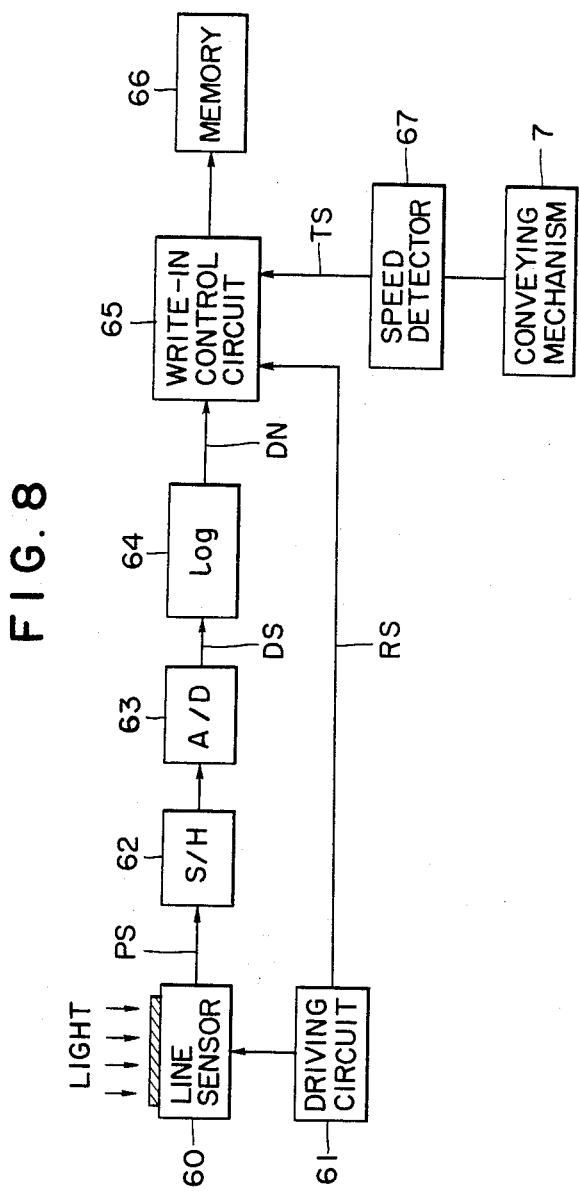

PHOTOGRAPHIC IMAGE INFORMATION DETECTING DEVICE

BACKGROUND OF THE INVENTION

The present invention relates to a device for detecting photographic image information on an original film in a photographic printing system and so on, and more particularly to a photographic image information detecting device which is capable of obtaining an apparently wide dynamic range even if a storage-type light receiving element having a narrow dynamic range is used (e.g., a two-dimensional area image sensor or a one-dimensional line sensor comprising a charge transfer device such as CCD).

In a photographic printer, it is necessary to measure the density of an original film (negative or positive film) in order to determine the exposure or correction required for printing the film. In the prior art, the average density of a negative film is photographically measured in LATD (Large Area Transmittance Density) by a photo-sensor such as a photodiode provided near the light pass of an optical system. This image detection in LATD uniformly determines the photometric value of the negative films, but does not precisely measure the density of images over all of the frame. This leads to such drawbacks as incorrect exposure or uncertain correction. There has also been proposed a method of segmenting a frame of a negative film horizontally and vertically into several segments, photographically measuring each of them to determine their necessary exposure, and finally correcting the exposure. However, since a photometric determination by this method is not quite precise, it cannot detect accurate image information about details of the images.

The image information detecting device for determining the density of an image must cover a wide dynamic range corresponding to the density range of an original film. It should also cover differences in lamps and filters used in the photometric system. The necessary dynamic range therefor amounts to about 1:10,000. It is also important for a printer to detect information from a relatively wide area of a frame for determining exposure or correction amount.

Such requirements are conventionally satisfied mainly with scanner-type density information detecting devices which are used as a light receiving element of a relatively wide dynamic range such as a photodiode and photomultiplier for scanning negative films. But a detecting device provided with such a scanning mechanism is complex in structure leading to a high cost in installation and a high rate of failures, and also requires much time for processing. The low processing speed in the whole system is attributable mainly to the large amount of time required for image processing, thus presenting a significant problem in the system.

The light receiving elements may comprise a charge transfer device (hereinafter referred to as a storage-type light receiving element) such as CCD (Charge Coupled Device) or BBD (Bucket Brigade Device) for electrical scanning, but there still remain a problem because the light receiving element of the storage-type has a particularly narrow dynamic range. If such an element is used, a dynamic range which is wide enough to carry out detection of the density information of negative films cannot be obtained.

SUMMARY OF THE INVENTION

The present invention is contrived in view of the aforementioned problems encountered with the prior art and aims at providing a photographic image information detecting device which can detect image information in a wide area of an original film in printers with a storage-type light receiving element of a wide dynamic range in appearance.

Another object of the present invention is to provide a photographic image information detecting device which can detect image information of an original film precisely in details with a simple construction.

According to the present invention, in one aspect thereof, for achieving objects described above, there is provided a photographic image information detecting device which comprises a light source for illuminating an original film, a storage-type light receiving element for detecting the amount of light from said original film, a driving circuit for driving said storage-type light receiving element, and a comparing/controlling means for comparing the output data of said storage-type light receiving element with a predetermined value and controlling the amount of emission from said light source, whereby the dynamic range of said storage-type light receiving element is widened for detecting the picture image information of said original film.

According to the present invention in another aspect thereof, there is provided a photographic image information detecting device which comprises a light source for illuminating an original picture film, a light compensation means provided between said original film and said light source for adjusting the amount of light transmission from said light source, a storage-type light receiving element for detecting the amount of light from said original film, a driving circuit for driving said storage-type light receiving element and a comparing/controlling means which compares the output data from said storage-type light receiving element with a predetermined value and controls said light adjusting means to adjust the illumination on said original film, whereby the dynamic range of said storage-type light receiving element is widened for detecting the picture image information of said original film.

Furthermore, according to the present invention in still another aspect thereof, there is provided a photographic image information detecting device which comprises a light source for illuminating an original picture film which moves at a predetermined speed, a line sensor which receives the light transmitted through or reflected from said original picture film, a driving circuit for driving the line sensor, and a signal processing circuit which consecutively processes picture image signals from said line sensor line by line in accordance with the conveying speed of said original film and stores the processed signals, whereby the picture image information over the whole surface of said original film is detected for each of an array of picture elements.

The nature, principle and utility of the invention will become more apparent from the following detailed description when read in conjunction with the accompanying drawings.

BRIEF DESCRIPTION OF THE DRAWINGS

In the accompanying drawings:

FIGS. 5A and 5B are explanatory diagrams showing the relation between the segmentation of picture elements of a negative film and the storage of data in a memory;

FIG. 6 is a constructive view showing another embodiment of the present invention;

FIG. 7 is an explanatory view showing positional relation between a line sensor and a negative film; and FIG. 8 is a block diagram showing the control system thereof.

DETAILED DESCRIPTION OF THE INVENTION

Figure 1:
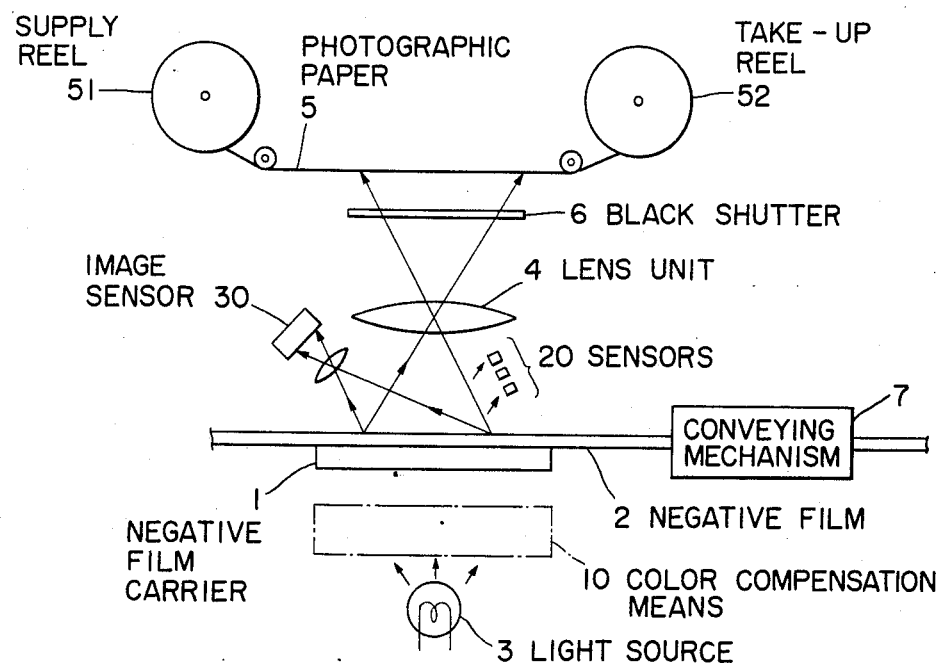
FIG. 1 is a constructive view of an embodiment of a photographic printer to which the present invention can be applied.

FIG. 1 shows an embodiment of a photographic printer to which the present invention can be applied. A negative film 2 is conveyed by a conveying mechanism 7 to a position on a negative film carrier 1 and is illuminated with the light from a light source 3 provided below. The light transmitted through the negative film 2 is directed to a photographic paper 5 via a lens unit 4 and a black shutter 6 to expose the negative image thereon. The black shutter 6 is controlled to open or close by a controlling mechanism (not shown). The photographic paper 5 is reeled out of a supply reel 51, then printed for each frame and wound on a take-up reel 52 thereafter. The light from the light source 3 is passed through a color compensation means 10 which is described later to illuminate the negative film 1. The light transmitted through the negative film 2 is detected by sensors 20 comprising three primary colors R (red), G (green) and B (blue) such as photodiodes respectively provided near the negative film 2. The exposure in the printer is determined by the above mentioned photometric detection.

Figure 2A:
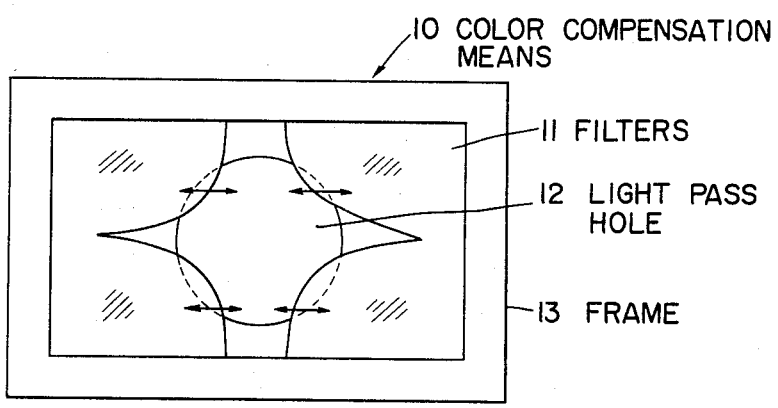
FIG. 2A is a plan view showing an embodiment of a color compensation means used in the printer.
Figure 2B:
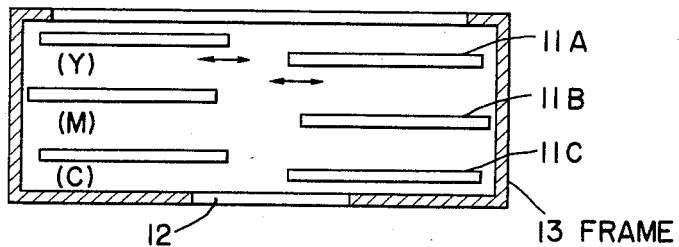
FIG. 2B is a vertical cross-sectional view thereof.

A two-dimensional image sensor 30 comprising a storage-type light receiving element is provided at a position close enough to the lens unit 4 to receive the transmitted light from the negative film 2 so as to detect image information thereof. The color compensation means 10 may have a structure, for example, of the mechanism shown in FIGS. 2A and 2B, which comprises a box-like frame 13 having a light pass hole 12 of a circular form at the center of the bottom. Filters 11 (11A through 11C) in the sectoral form are provided for each of the 3-primary colors of Yellow (Y), Magenta (M) and Cyan (C) in the frame 13 in combination and in staggered layers. By relatively moving left and right pairs of filters 11 in the lateral direction, the amount of the light transmitted through the light pass at the center which is defined by the light pass hole 12 can be adjusted for each color. The movements of the filters 11A through 11C for respective 3-primary colors are respectively controlled by a controlling mechanism (not shown).

Figure 3:
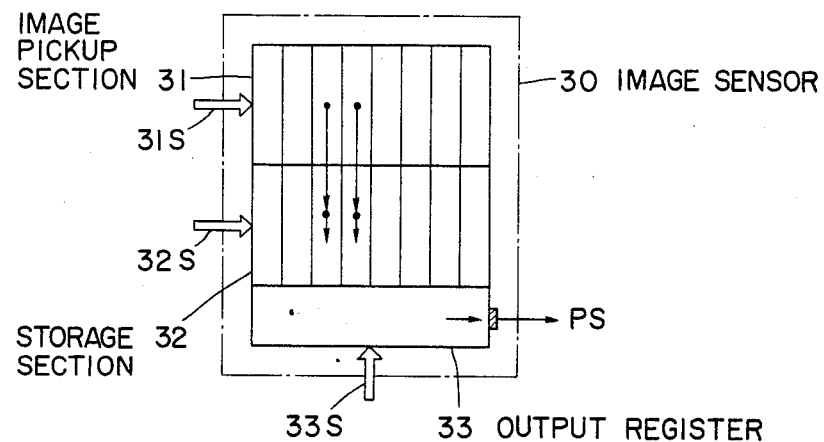
FIG. 3 is a diagram showing the function of a storage-type light receiving element (or an image sensor) which is to be used in the present invention.

A two-dimensional image sensor 30, on the other hand, comprises, as shown in FIG. 3, an image pickup section 31 which carries out photoelectric conversion corresponding to the amount of the received light, a storage section 32 which transmits in parallel the signals stored in the image pickup section 31 in a short time for storage, and an output register 33 which transfers the charge patterns stored in the storage section 32 by a standard scanning method and outputs them as a serial analog signal. The above mentioned image pickup section 31, the storage section 32 and the output register 33 are respectively driven by driving signals 31S, 32S and 33S sent from a driving circuit of the image sensor 30. The picture signal PS outputted from the output register 33 is the electrical signal corresponding to the amount of light emitted to a physical area of the image pickup section 31 which is arranged in serial. Accordingly, if the image pickup section is driven by setting the storage time of the storage section 32 at a constant value, th output register 33 outputs a serial electrical signal at a level as a picture signal PS which completely corresponds to the amount of the light illuminating the image pickup section 31.

Figure 4:
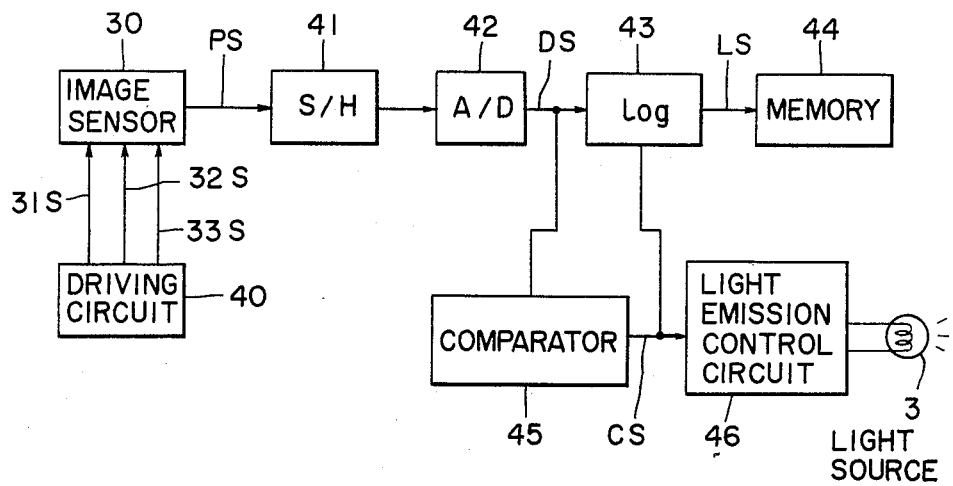
FIG. 4 is a block diagram showing an embodiment of the present invention.

FIG. 4 is a block diagram showing the controlling system according to the present invention. The two-dimensional image sensor 30 is adapted to be driven by an image pickup signal 31S, a storage signal 32S and an output signal 33S from a driving circuit 40. The picture signal PS outputted from the image sensor 30 is sampled and held once for a predetermined time period by a sample-and-hold circuit 41, and then converted into digital signals DS by an analog-to-digital (A/D) converter 42, and then further converted logarithmically into density signals LS by a logarithmic converter 43 and finally stored in a memory 44. The digital signals DS from the A/D converter 42 are inputted to a comparator 45 and compared with a predetermined reference value. The comparison result CS of the comparator 45 is inputted to a light emission control circuit 46 for controlling the light from the light source 3. The comparison result CS is also inputted into a logarithmic converter 43 so that, even if the amount of the light emitted from the light source 3 varies, the density data corresponding to actual image information of the negative film 2, or in other words, the density data which has been adjusted to a value with a constant light volume, will be stored in a memory 44. The two-dimensional image sensor 30 may comprise a total of 350 elements arranged, for instance, with 14 elements vertically and 25 elements laterally in one frame of a 135-type film (known as 35 mm film). The memory 44 and the driving circuit 40 are connected to a printing exposure controlling computer (CPU) (not shown) in a photographic printer for the whole control. The logarithmic converter 43 may be a look-up table by which an appropriate value of memory can be selected depending on the comparison result CS.

In such a structure, as mentioned above, when a start command is sent from the CPU to the driving circuit 40, a frame of the negative film 2 is conveyed by the conveying mechanism 7 to the printing position on the negative film carrier 1. The driving circuit 40 at the same time sends out an image pickup signal 31S to the image sensor 30 to store charges of the whole surface of the negative film 2 with a storage signal 32S for a predetermined storage time. Then, when an output signal 33S is outputted, the charges stored in the storage section 32 are taken out of the output register 33 in the form of picture signal PS. The two-dimensional image sensor 30 segments the whole surface of a frame into picture elements 21 in the order shown in the scanning line SL1 in FIG. 5A for measurement. The picture signal PS is inputted into a sample-and-hold circuit 41 for sampling and holding, then converted into digital signals DS for each sampled value by the A/D converter 42 and inputted into the comparator 45. The comparator 45 checks whether or not the digital signals DS remain within a predetermined scope (the actual dynamic range of the image sensor 30). If the maximum value of the digital signals DS exceeds the above mentioned scope, a control signal CS is sent out of the comparator 45 to the light emission control circuit 46 in order to reduce the amount of the light emitted from the light source 3. The image sensor 30 then again reads the picture signal from the negative film 2 and the comparator 45 checks whether or not it remains within the scope of the present values and controls the light emission, from the light source 3 to restrict it so as to be within the predetermined range. All of this control information is sent to the CPU. When the maximum value of the digital signals DS is controlled to be within the predetermined range, a control signal CS is inputted into a logarithmic converter 43. The logarithmic converter 43 reads out of the look-up table the particular digital signal DS corresponding to the light emission from the light source 3 and stores the density data thereof in a memory 44. When the minimum value of the digital signals DS from the A/D converter 42 exceeds the predetermined scope, the comparator 45 directs the light emission control circuit 46 to increase the light emission from the light source 3 with a control signal CS repeatedly until such time that the minimum value of the digital signals DS is within the predetermined scope. The logarithmic converter 43 then reads out the look-up table corresponding to the comparison result CS to obtain a density data LS and then stores the data in the memory 44. The data storage in the memory 44 has, for example, the relationship with respect to the picture element arrangement as shown in FIG. 5B.

As described above, the dynamic range of the photographic read-out area of light which the image sensor 30 actually receives can be limited to be within a certain range by controlling the emission from the light source 3 within the predetermined scope or, in other words, by controlling the maximum and the minimum values of the picture image signal PS of a negative film 2 to be within a scope set corresponding to the actual dynamic range of the image sensor 30. The fluctuation in light emission is inputted into the logarithmic converter 43 as control signals CS to read out a corresponding value from the look-up table. Therefore, the fluctuation-compensated density data on emission is stored in the memory 44 as the actual picture image information of the negative film 2. When a picture image of the negative film 2 is read out, the image sensor 30 can read with an apparent dynamic range which has been made considerably wide. The dynamic range of the image sensor 30, as a result, can be widened. If a series of picture image detections are repeated for each of the 3-color separation filters, the three primary color density data can be obtained for a negative film. The CPU reads out a picture image information stored in a memory and uses the data as the information for printing.

In the above embodiment, the picture signal PS from the image sensor 30 is compared with a preset value, and the result of the comparison is used for controlling the emission from the light source 3 to make the dynamic range, of the image sensor 30 apparently wide. A similar effect can be attained by controlling the storage time of the image sensor 30 via a driving circuit 40 instead of controlling the emission from the light source 3. In this case, however, if the storage time of the image sensor 30 is extended, not only the time for detecting the picture image information becomes longer, but also the dark current in the image sensor 30 increases. This presents a problem because the dark current increases corresponding to the temperature of the image sensor 30. If the image sensor 30 must be controlled with respect to its storage time, it is preferable to set the maximum of the storage time short enough so as not to be affected by the dark current and so as to control the storage time so as to be within a predetermined limit. If the storage time should be prolonged beyond such time scope or, in other words, if the density value is beyond the scope, it is still possible to widen the dynamic range of the image sensor 30 by increasing the emission from the light source 3 to intensify the illumination upon the negative film 2. A similar effect can be obtained by adjusting the color compensation filters shown in FIGS. 2A and 2B which are used in a photographic printer, so as to control the amount of light emitted onto the negative film 2 instead of controlling the storage time or light emission. Alternatively, the illumination can be adjusted by a neutral color filter provided in the color compensation means 10. The dynamic range of the image sensor 30 may be apparently widened by adjusting the aperture mechanism of the lens unit 4 so as to adjust the amount of light directed toward the image sensor 30.

Although the image sensor 30 in the above embodiment is placed at a position at an inclination outside the optical axis for printing, the sensor may be arranged on the optical axis in a mechanically movable manner. The image sensor 30 is positioned arbitrarily so long as it can photographically detect the density of the negative film 2. In the above embodiment, although the amount of the light transmitted through the negative film 2 is detected by the image sensor 30, it is possible to obtain picture image information by detecting the amount of light reflected from the negative film 2. Although the two-dimensional image sensor 30 is used to detect the image information of the negative film 2 in the printer it may be utilized with other optical devices for reading image information of an original film with a wide apparent dynamic range. The density data is stored in a memory in the fluctuation-compensated form in the above embodiment, but the change in emission may be separately stored in a memory while the density data from the image sensor may be stored therein without adjustment.

Needless to say, the above described detection is applicable to storage-type light receiving elements of a line sensor. The detection with a line sensor is described below.

FIG. 6 shows an embodiment of a photographic printer using a line sensor 60. A negative film 2 placed on a negative film carrier 1 is conveyed, for instance, in the direction N by the conveying mechanism 7. While being conveyed, a line sensor 60 detects the image information of the negative film 2 via a lens unit 8. Except for this feature, the embodiment is identical to the one shown in FIG. 1. The positional relationship between the line sensor 60 and the movement of the film 2 is shown in FIG. 7. The line sensor 60 is arranged at a position perpendicular to the conveying direction N of the negative film 2 and in parallel to the surface thereof. The scanning of a frame is determined by the relationship between the scanning line SL2 and the conveying direction N of the negative film 2 shown in FIG. 5A and the image information of one frame can therefore be taken out as one frame of the negative film 2 is conveyed.

FIG. 8 is a block diagram showing the control system of a line sensor 60. The line sensor 60 is driven by a driving circuit 61, the picture signal PS, which is read out and photoelectrically converted by the line sensor 60, is inputted into a sample-and-hold circuit 62 and sampled at a predetermined speed. The sampled value is converted into digital signals DS by an A/D converter 63. The digital signals DS from the A/D converter 63 are inputted into a logarithmic converter 64, and converted into density signals DN and then written in a memory 66 via write-in control circuit 65. In this case, the write-in control circuit 65 receives a reading-out speed signal RS outputted in correspondence with the driving speed of the driving circuit 61 and a speed signal TS from a speed detector 67 connected to the conveying mechanism 7 which conveys the negative film 2. The write-in control circuit reads the picture image information for each line in correspondence with the reading speed of the line sensor 60 and the conveying speed of the negative film 2, whereby the memory 66 can store density value data for each of the segmented elements which are arranged in plural arrays similar to the one shown in FIG. 5B.

When the image information of a negative film 2 is detected by a line sensor 60 with the aforementioned structure, the negative film 2 is carried by the conveying mechanism 7 in the direction N with a predetermined speed. The conveying speed is detected by a speed detector 67 and the speed signal TS is inputted into a write-in control circuit 65. When the negative film 2 is carried in the direction N, the light which is transmitted through the negative film 2 is inputted into the line sensor 60. The line sensor 60 is then driven by a driving circuit 61 with a driving signal to output a picture signal PS which is photoelectrically converted in accordance with the amount of received light. As the reading speed of the line sensor 60 corresponds with the pulse frequency of the driving signal from the driving circuit 61, if the line sensor 60 is driven at a speed relatively higher than the conveying speed of the negative film 2, the negative film 2 can consecutively be segmented into plural and arrayed picture elements 21 by a scanning line SL2 which is perpendicular to the direction N as shown in FIG. 5A. The picture signal PS from the line sensor 60 for each scanning line SL2 is inputted into the sample-and-hold circuit 62 and the sampled value is converted into digital signals DS by the A/D converter 63. The digital signals DS are converted into density signals DN by the logarithmic converter 64 and written in the memory 66 via a write-in control circuit 65. Since the reading speed signal RS is inputted into the write-in control circuit 65 from the driving circuit 61 to determine the relationship between the reading-out and the writing-in, the density signals DN from the logarithmic converter 64 consecutively cause the density data to be written in at the position corresponding to the segmentation of the negative film 2 as shown in FIG. 5B. By repeating the detection of picture image information for each scanning line SL2 by the line sensor 60 and the writing-in of the density data in the memory 66 over the whole surface of the negative film 2, the density signals DN are stored in the memory 66 in array corresponding to the segmented picture elements 21 of the picture frame.

Although the line sensor 60 is fixed and the negative film 2 is conveyed at a predetermined speed to the line sensor 60 for detecting the image information over the whole surface of the film in the above embodiment, it is possible to have the negative film 2 fixed and to have the line sensor 60 moved across the whole surface of the negative film 2 to achieve the same effect.

As described in the foregoing, since the present invention enables control of either the amount of the light which reaches an image sensor in correspondence with the picture image information or the storage time of the image sensor, the dynamic range of the image sensor can be widened to detect image density information of a wide area with a high accuracy. Since the device according to the present invention can detect picture image information on an original film such as negative film by segmenting the film into a large number of picture elements and can store such information in a memory, the information can be utilized as information on the amount of exposure to be used, for instance, in a printing system.

It should be understood that many modifications and adaptations of the invention will become apparent to those skilled in the art and it is intended to encompass such obvious modifications and changes in the scope of the claims appended hereto.

What is claimed is:

1. A photographic, image information detecting device which comprises a light source for illuminating an original film, a storage-type light receiving element for detecting the amount of light from said original film, a driving circuit for driving said storage-type light receiving element, and a comparing/controlling means for comparing the output data of said storage-type light receiving element with a predetermined value and for controlling the amount of emission from said light source, whereby the dynamic range of said storage-type light receiving element is widened so as to detect the picture image information of said original film.

2. A photographic image information detecting device as claimed in claim 1, wherein said comparing/controlling means is adapted to control the storage time of said storage-type light receiving element via said driving circuit within a range which is not affected by the dark current of said storage-type light receiving element, and said comparing/controlling means is further adapted to control the light emission amount of said light source outside of said range.

3. A photographic image information detecting device as claimed in claim 2, wherein said storage-type light receiving element is adapted to detect the amount of light transmitted through said original film.

4. A photographic image information detecting device which comprises a light source for illuminating an original picture film, a light compensation means provided between said original film and said light source for adjusting the amount of light transmitted from said light source, a storage-type light receiving element for detecting the amount of light from said original film, a driving circuit for driving said storage-type light receiving element and a comparing/controlling means which compares the output data from said storage-type light receiving element with a predetermined value and controls said light compensation means so as to adjust the illumination on said original film, whereby the dynamic range of said storage-type light receiving element is widened for detecting the picture image information of said original film.

5. A photographic image information detecting device s claimed in claim 4, wherein said light compensation means comprises three primary color filters.

6. A photographic image information detecting device as claimed in claim 4, wherein said light compensation means comprises a neutral density filter.

7. A photographic image information detecting device as claimed in claim 4, wherein said light compensation means comprises an aperture mechanism of a light passage.

8. A photographic image information detecting device which comprises a light source for illuminating an original picture film which moves at a predetermined speed, a line sensor which receives the light transmitted through or reflected from said original picture film, a driving circuit for driving the line sensor, and a signal processing circuit which consecutively processes picture image signals from said line sensor line by line in accordance with the conveying speed of said original film and stores the processed signals, whereby the picture image information over the whole surface of said original film is detected from each of an array of picture elements.

9. A photographic image information detecting device as claimed in claim 8, wherein said signal processing circuit comprises an A/D converter which converts said picture image signal into digital signals, a logarithmic converter which logarithmically converts the digital signals outputted from said A/D converter to density signals, and a memory which stores the density signals from said logarithmic converter.

10. A photographic image information detecting device as claim in claim 8, wherein said line sensor is arranged at an inclined position with respect of the optical axis of said light source and said original picture film, and perpendicular to the advancing direction of said original picture film.

11. A photographic image information detecting device as claimed in claim 1, wherein said storage-type light receiving element is adapted to detect the amount of light transmitted through said original film.

* * * * *